June 23, 1959  H. M. GEYER ET AL  2,891,380
DUAL DRIVE ACTUATOR AND CONTROL MEANS THEREFOR
Filed Sept. 13, 1954  2 Sheets-Sheet 1
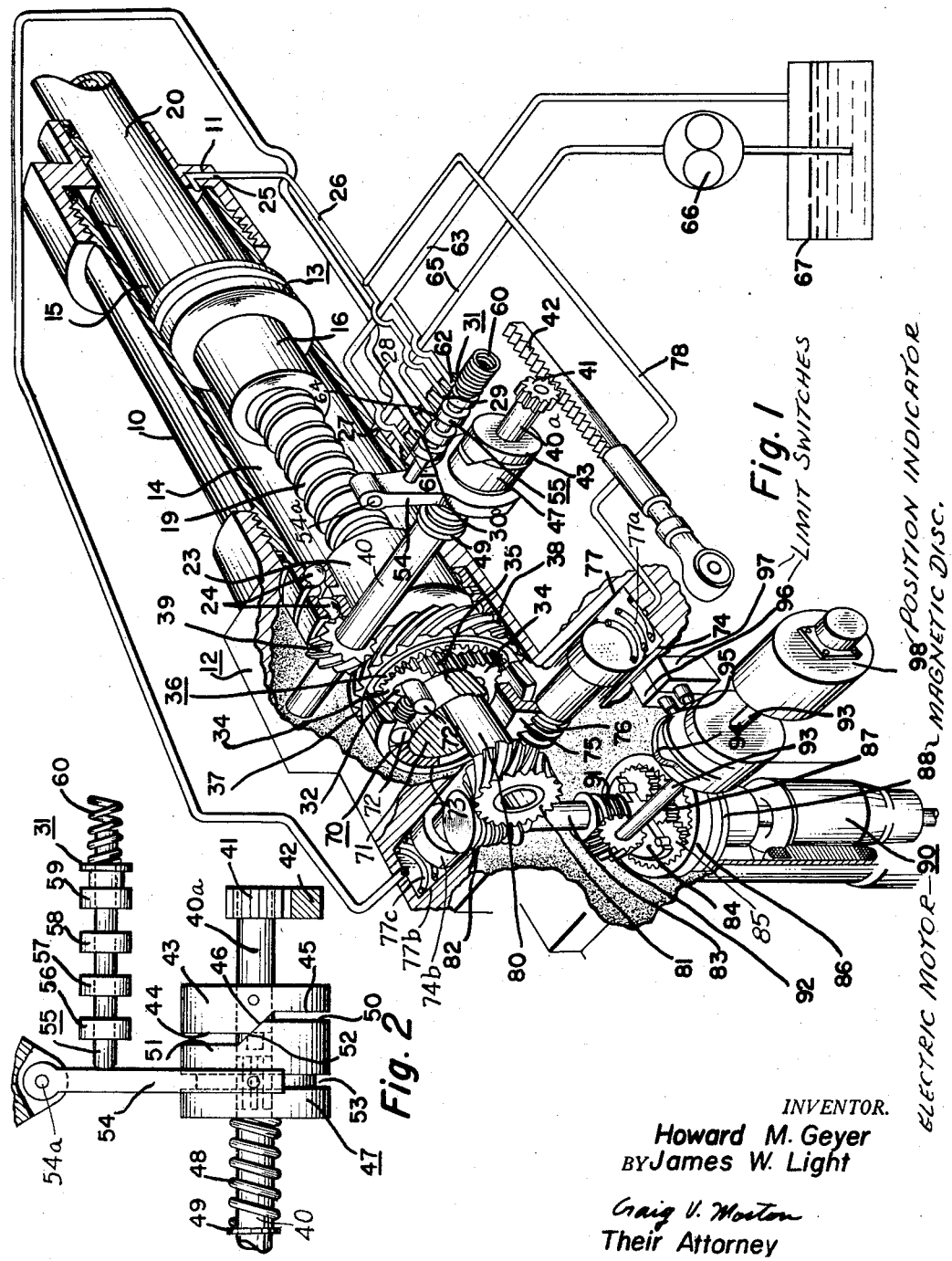
INVENTOR.
Howard M. Geyer
BY James W. Light
Craig V. Morton
Their Attorney INVENTORS
Howard M. Geyer
James W. Light
Their Attorney United States Patent Office 2,891,380
Patented June 23, 1959

2,891,380
DUAL DRIVE ACTUATOR AND CONTROL MEANS THEREFOR

Howard M. Geyer, Dayton, and James W. Light, Greenville, Ohio, assignors to General Motors Corporation, Detroit, Mich., a corporation of Delaware Application September 13, 1954, Serial No. 455,434

10 Claims. (Cl. 60—6)

This invention pertains to actuators, and particularly to actuators of the dual drive type.

Heretofore, actuators of the dual drive type have been designed wherein the position of the actuator piston can be adjusted by either fluid under pressure or an electric motor. Actuators of this type are disclosed in the Geyer Patents 2,620,683, 2,660,026, 2,660,027 and 2,660,028. This type of actuator assembly comprises a cylinder having disposed therein a reciprocable piston capable of fluid pressure actuation in both directions, the piston being operatively connected to a rotatable member. Inasmuch as piston movement is dependent upon rotation of the member, or screw shaft, the actuator assembly may include locking means for restraining rotation of the screw shaft, thereby locking the actuator piston against movement. The electric motor, or auxiliary driving means, is operatively connected to the screw shaft through the locking means. With this type of arrangement, the locking means must be in the locked condition to effect piston reciprocation by the electric motor. In the present invention, the piston can be reciprocated by actuating the control valve through energization of the electric motor, or rotation of the screw shaft by operation of the motor, irrespective of the condition of the locking means. Accordingly, among our objects are the provision of an actuator assembly including a reciprocable piston and wherein the piston position may be adjusted by the simultaneous manual application of fluid under pressure and energization of an electric motor to control the application of fluid under pressure to the actuator assembly; the further provision of a dual drive actuator including locking means and auxiliary driving means, wherein the position of the actuator piston may be adjusted by the auxiliary driving means; the further provision of an actuator of the aforesaid character including releasable locking means; and the still further provision of simplified, follow-up means for controlling fluid pressure operation of the actuator.

The aforementioned and other objects are accomplished in the present invention by the inclusion of a planetary gear set which operatively interconnects the screw shaft, the locking means and the electric motor. Specifically, the actuator includes a cylinder having disposed therein a reciprocable piston capable of fluid pressure actuation in both directions. The piston is operatively connected with a screw shaft that is rotatably supported in the cylinder such that piston reciprocation is dependent upon and effects screw shaft rotation.

The screw shaft constitutes the planet carrier of a planetary gear set. Accordingly, a plurality of planet pinions are journaled on stub shafts carried by the screw shaft. The sun gear is connected to a shaft having a pilot bearing support in the hollow screw shaft. The ring gear includes a helically geared exterior portion which meshes with a helical pinion gear. The helical pinion gear is connected with a shaft which slidably supports a cam follower for positioning a valve for controlling fluid pressure operation of the actuator. The manual control arrangement for the control valve includes a rack and pinion, the pinion being operatively connected with a cam attached to a shaft having a pilot bearing in the cam follower shaft, and maintained in engagement with the follower.

The actuator also includes releasable locking means for restraining rotation of the screw shaft, and, hence, precluding piston reciprocation in the absence of fluid pressure actuation. The locking means are released concurrently with the application of fluid pressure to the cylinder, and are operatively connected with the ring gear of the planetary gear set. The sun gear is operatively connected to a reversible electric motor through reduction gearing and a magnetic clutch and brake assembly. When the electric motor is deenergized, the brake restrains rotation of the sun gear. Upon motor energization, the clutch is energized, thereby releasing the brake and imparting rotation to the sun gear.

Further objects and advantages of the present invention will be apparent from the following description, reference being had to the accompanying drawings wherein a preferred embodiment of the present invention is clearly shown.

In the drawings:

Fig. 1 is a composite view depicting a fragmentary perspective view, partly in section and partly in elevation, of the improved actuator assembly, in combination with a fluid pressure system therefor.

Fig. 2 is a fragmentary view, in elevation, of the follow-up valve control means.

Figure 3:
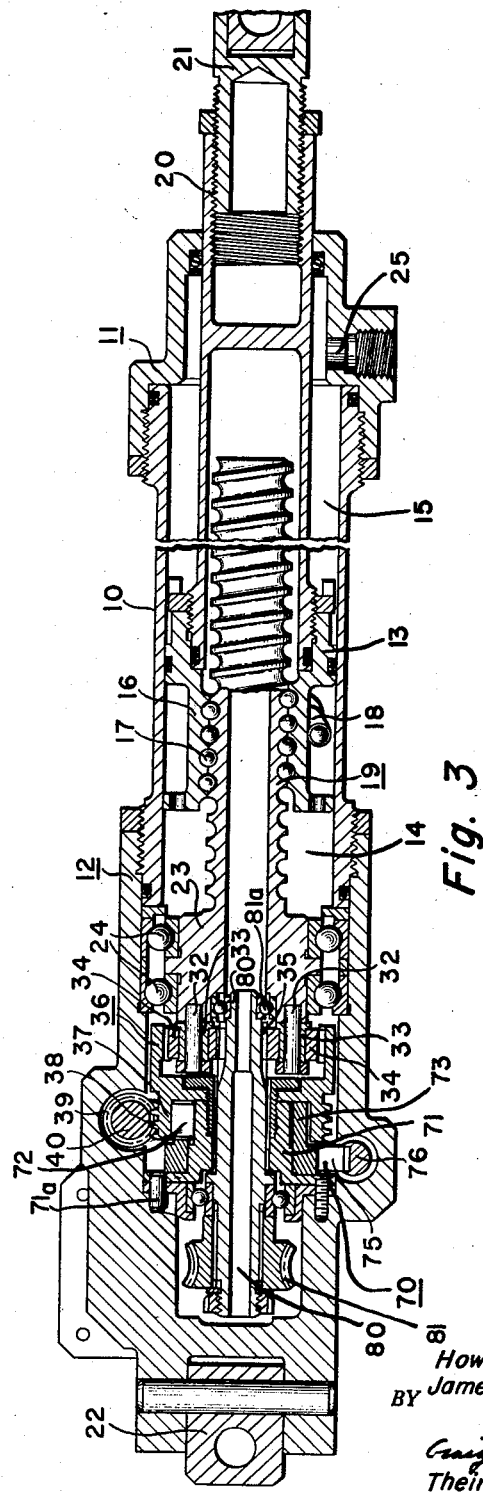
Fig. 3 is a longitudinal view, partly in section and partly in elevation, of an actuator constructed according to this invention, with certain parts removed.

With particular reference to Figs. 1 and 3 of the drawings, the actuator includes a cylinder 10 having externally threaded portions adjacent opposite ends thereof. One end of the cylinder 10 receives a tail cap assembly 11 and the other end of the cylinder receives a head cap assembly 12. The cylinder 10 has disposed therein a reciprocable piston 13 capable of fluid pressure actuation in both directions. The piston 13 divides the cylinder 10 into an extend chamber 14 and a retract chamber 15, the piston also being formed integral with a nut 16 having an internal spiral groove of semi-circular cross section. The nut 16 constitutes a component of the well known ball, screw and nut coupling, which as depicted in Fig. 3, includes a plurality of balls 17 that are free to circulate through a passage 18, and a hollow screw shaft 19 having a complementary spiral groove of semi-circular cross section. The piston 13 is also anchored to a hollow rod 20, which extends through and sealingly engages the tail cap assembly 11. Preferably, although not necessarily, the piston rod 20 may have attached thereto a suitable fixture member 21, by which means the rod may be connected to a movable load device, not shown. In an installation of this character, the head cap assembly 12 includes a clevis 22 by which means it may be attached to a fixed support, not shown.

The screw shaft, or rotatable member 19, includes an enlarged hub portion 23, journaled for rotation by a ball bearing assembly 24, which is supported within the head cap assembly 12 and maintained in position by the cylinder 10. It will be appreciated that by virtue of the fact that the piston 13 is operatively connected with the screw shaft 19, piston reciprocation is dependent upon and effects rotation of the screw shaft 19. In order to effect fluid pressure operation of the actuator, the tail cap assembly 11 is formed with a port 25 having connection with a conduit 26, while the cylinder 10 is formed with a port 27 having connection with a conduit 28. The conduits 26 and 28 communicate with control ports 29 and 30, respectively, of a control valve assembly, generally depicted by the numberal 31 in Fig. 1.

The hub portion 23 of the screw shaft 19, as seen in Fig. 3, carries a plurality of stub shafts 32, which support sleeve bearings 33 about which planet pinions 34 are rotatably supported. Thus, the hub 23 constitutes a planet carrier. The planet pinions 34 constitute components of a planetary gear set, which also includes a sun gear 35 and a ring gear 36.

The ring gear 36 includes an axially extending skirt portion 37 having external helical gear teeth 38. The helical gear teeth 38 mesh with a helical pinion gear 39, which is suitably attached to a cam follower shaft 40 that is rotatably supported by suitable bearing means, not shown, within the head cap assembly 12. The shaft 40 extends at right angles to the screw shaft 19, and the outer end thereof has a cam shaft 40a piloted therein. The shaft 40a has attached thereto a pinion gear 41, which meshes with a reciprocable rack 42, as shown in Fig. 1. The rack 42 is capable of manual movement in either direction. The shaft 40a also has attached thereto and rotatable therewith, as particularly shown in Fig. 2, a cam member 43 having a rise 44, a dwell 45, and an inclined portion 46 interconnecting the rise and dwell. The came 43 operatively engages a complementarily formed cam follower 47, which is restrained against rotation relative to the shaft 40, but capable of axial movement relative to the shaft 40 since it has a straight spline connection therewith as shown in Figure 2. The cam follower 47 is maintained in contact with the cam 43 by means of a compression spring 48, which is confined between the cam 47 and the integral shoulder 49 on the shaft 40. The cam follower 47 includes a rise 50, a dwell 51, an inclined portion 52 interconnecting the rise and dwell, as well as an annular groove 53 arranged to receive the bifurcated end of a follower lever 54, the lever 54 being pivotally mounted by pin 54a to a fixed support. Accordingly, upon reciprocable movement of the cam 47 relative to the shaft 40, a like reciprocable movement will be imparted to the lever 54, which operatively engages a spool valve element 55 of the control valve assembly 31.

The fluid pressure control system for the actuator of this invention is of the closed loop servo type. That is, the actuator includes automatically operable follow-up means for repositioning the spool valve 55. The spool valve 55 includes a plurality of lands 56, 57, 58 and 59, the plunger 55 being maintained in engagement with the cam follower lever 54 by means of a compression spring 60.

As seen in Fig. 1, the valve assembly 31 includes a pair of drain ports 61 and 62, which are connected to a drain conduit 63, as well as a supply port 64, which is connected to a supply conduit 65. The supply conduit communicates with the outlet of a pump 66, the inlet of which communicates with a reservoir 67. The drain conduit 63 also communicates with the reservoir 67. Thus, during fluid pressure operation of the actuator, the operator adjusts the position of the rack 42, thereby imparting rotation to the gear 41 and the shaft 40a. Assuming the rack 42 is moved to the right, as viewed in Fig. 1, counterclockwise rotation will be imparted to the shaft 40a and the cam 43. Thus, the cam follower 47 will be moved to the left, as viewed in Fig. 2, as will the follower lever 54 whereupon the spring 60 will move the plunger 55 to the left. In this manner, the supply port 64 will be connected to the control port 30 while the control port 29 will be connected to the drain port 62. Thus, fluid under pressure will be supplied to the extend chamber 14 while the retract chamber 15 is connected to drain. When the actuator piston 13 has moved throughout a distance equivalent to the distance selected by movement of the rack 42, the cam follower 47 will be returned to the neutral position, as shown in Figs. 1 and 2 whereupon the valve spool 55 will also be returned to the neutral position, thereby interrupting the application of fluid pressure to the extend chamber 14. Thus, it is apparent that the actuator includes a closed loop, follow-up servo type valve control.

The skirt portion 37 of the ring gear 36 also constitutes a component of locking means 70 capable of restraining rotation of the ring gear 36, thereby restraining rotation of the screw shaft 19 when the sun gear 35 is restrained against rotation. In this manner, the actuator piston 13 can be locked against movement and retained in any adjusted position of its stroke. The locking means depicted in Figs. 1 and 3 are of the bidirectional type, as disclosed in copending application, Serial No. 296,607, filed July 1, 1952, in the name of Howard M. Geyer, now patent No. 2,705,939. Thus, the skirt 37 constitutes a locking collar within which a fixed cam member 71 having three circumferentially spaced flats separated by arcuate portions, is disposed, the cam member 71 being rigidly connected to the head cap 12 by dowel pin 71a. The locking means also includes a plurality of roller lock assemblies 72, which are disposed on the flats of the cam 71 and a fingered lock releasing member 73. In accordance with the teachings of the aforementioned copending application, the lock releasing collar 73 is operatively connected to a pair of reciprocable lock release pistons 74 and 74b. The interconnection between the lock release pistons and the locking collar 73 is constituted by a rack 75 and worm 76. The lock release piston 74 is disposed within a lock release cylinder 77 formed within the head cap assembly 12, the cylinder 77 being connected by a conduit 78 with the retract conduit 26. The other lock release piston 74b and cylinder 77b combination is connected with the extend conduit 28. The lock release pistons are normally centered by oppositely acting springs 77a and 77c. The arrangement of the releasable locking means is such that upon fluid pressure application to the extend chamber, locking means are concurrently released so as to permit rotation of the ring gear 36 and the screw shaft 19 in a direction permitting outward movement of the piston 13 while movement in the opposite direction is prevented. Conversely, upon fluid pressure application to the retract chamber 15, the locking means are concurrently released to permit movement of the ring gear, screw shaft and piston in the opposite direction, as specifically set forth in the aforementioned copending application.

The sun gear 35 is connected to rotate with a hollow shaft 80, which has a pilot bearing support 81a in the hub portion 23 of the screw shaft 19, as depicted in Fig. 3. The shaft 80 has attached thereto a worm gear 81, which drivingly engages a worm 82. The worm 82 is attached to a shaft 83, which is connected to the planet carrier 84 of a planetary gear set 85. The ring gear 86 of the planetary gear set 85 is restrained against rotation, and the sun gear 87 is connected to a magnetic disc 88. The magnetic disc 88 constitutes a component of a combination magnetic clutch and brake assembly of the type disclosed in the aforementioned patents. Upon energization of the electric motor 90 or auxiliary driving means, the clutch is energized so as to drivingly connect the disc 88 with the armature of the motor 90 and in this manner, rotation will be imparted through the reduction gearing to the shaft 80 and the sun gear 35. Upon deenergization of the motor 90, rotation of the sun gear 35 and the shaft 80 is restrained through the reduction gearing by a friction brake. Thus, whenever the auxiliary driving means 90 is deenergized, the sun gear 35 is restrained against rotation. Accordingly, the locking means 70 must be released in order to adjust the position of the actuator piston by manual actuation of the valve 31. However, when the electric motor 90 is energized, the position of the actuator piston can be adjusted irrespective of the condition of the locking means. Thus, if the locking means 70 are locked, rotation of the sun gear 35 will impart rotation to the screw shaft 19 through the planet pinions 34. Moreover, if the locking means 70 are released, rotation of the sun gear 35 will be operative to effect rotation of the ring gear 36, rotation of the ring gear 36 actuating the valve 31 through shaft 40, cam follower 47 and lever 54. Accordingly, it will be appreciated that with the actuator of this invention, the piston 13 can have imparted thereto simultaneous movement by two independent control means, namely manual control of fluid under pressure and the reversible electric motor 90 control of fluid under pressure to the actuator. This feature is extremely valuable, especially in situations wherein precision control of actuator position is desired, since it is impractical to effect precision positioning with manual control. Thus electric motor control of the valve constitutes a trimming adjustment.

The shaft 83 also has attached thereto a second worm 91, which meshes with a worm gear 92 attached to a shaft 93. The shaft 93 has attached thereto a pair of cams 94 and 95, which are operatively associated with a pair of limit switches 96 and 97, respectively. The limit switches 96 and 97 are actuated through the gearing by the shaft 93 and operate to automatically deenergize the electric motor 90 when the actuator piston has been moved to either end position of its stroke by the electric motor. In addition, the shaft 93 may be connected to a suitable position indicator 98, which may be of the potentiometer type, the positioner 98 indicating at all times the position of the piston 13 within the cylinder 10.

While the embodiment of the present invention as herein disclosed, constitutes a preferred form, it is to be understood that other forms might be adopted.

What is claimed is as follows:

1. A dual drive actuator including in combination, a cylinder, a reciprocable piston disposed in said cylinder capable of fluid pressure actuation in both directions, a member rotatably supported in said cylinder and operatively connected to said piston whereby piston reciprocation is dependent upon rotation of said member, said member constituting a planet carrier for a planetary gear set including a ring gear, a sun gear and a plurality of planet pinions supported by said carrier, releasable locking means operatively connected with said ring gear, auxiliary driving means operatively connected with said sun gear, said auxiliary driving means, when inactive, maintaining the locking means operative to restrain rotation of said rotatable member in the absence of fluid pressure application to said cylinder and, when active, operative to rotate said sun gear and said member so as to effect piston reciprocation with the locking means in the locked condition.

2. The combination set forth in claim 1 wherein said auxiliary driving means comprises a reversible electric motor.

3. The combination set forth in claim 2 wherein said auxiliary driving means includes a brake for restraining rotation of said sun gear when said electric motor is deenergized.

4. An actuator assembly including in combination, a cylinder, a reciprocable piston disposed in said cylinder, a member rotatably journaled in said cylinder and operatively connected to said piston whereby piston reciprocation is dependent upon rotation of said member, said member constituting the carrier of a planetary gear set, and releasable locking means operatively connected with said planetary gear set and effective to prevent rotation of said member at any position of the piston within said cylinder and, consequently, preventing piston reciprocation when the actuator is inactive.

5. An actuator assembly including in combination, a cylinder, a reciprocable piston disposed in said cylinder, a member rotatably supported in said cylinder and operatively connected to said piston whereby piston reciprocation is dependent upon rotation of said member, said member constituting a planet carrier for a planetary gear set, said planetary gear set including a ring gear and a sun gear, means operable to restrain rotation of one of said gears, and releasable locking means operatively connected with the other of said gears and effective to prevent rotation of said member when said one gear is restrained against rotation whereby piston reciprocation will be prevented when the actuator is inactive.

6. The combination set forth in claim 5 wherein said releasable locking means are operatively connected with the ring gear of said planetary gear set, and wherein said planetary gear set includes a plurality of pinions supported by said carrier.

7. An actuator assembly including in combination, a cylinder, a reciprocable piston disposed in said cylinder capable of fluid pressure actuation in both directions, a member rotatably supported in said cylinder and operatively connected to said piston whereby piston reciprocation effects rotation of said member, a valve for controlling the application of fluid under pressure to said cylinder, manually operable means including a first rotatable shaft having attached thereto a cam and a second rotatable shaft having a cam follower connected to rotate with said second shaft but slidable axially thereof for positioning said valve so as to effect a predetermined movement of said piston, and means interconnecting said second shaft and said rotatable member for repositioning said valve through said cam follower so as to interrupt the application of fluid pressure to said cylinder when said piston has completed said predetermined movement.

8. An actuator assembly including in combination, a cylinder, a reciprocable piston disposed in said cylinder capable of fluid pressure actuation in either direction, a member rotatably journaled in said cylinder and operatively connected to said piston whereby piston reciprocation is dependent upon rotation of said member, said member constituting the carrier of a planetary gear set including a ring gear, a sun gear and a plurality of planet pinions supported by said carrier, locking means operatively connected with said ring gear for restraining rotation of said member when the sun gear is held against movement to prevent piston movement when the actuator is inactive, fluid pressure operated means to release said locking means, a valve for controlling the application of fluid pressure from said cylinder and to said lock releasing means, manually operable means for positioning said valve to concurrently apply fluid pressure to said lock releasing means and to said cylinder so as to effect a predetermined movement of said piston, and means operatively interconnecting said ring gear and said valve for repositioning said valve to interrupt the application of fluid pressure to said cylinder and to said lock releasing means when said piston has completed said predetermined movement.

9. The combination set forth in claim 8 wherein the actuator assembly includes auxiliary driving means operatively connected with said sun gear, said auxiliary driving means, when inactive, maintaining the locking means operative and, when active, operative to rotate said planet carrier with the locking means in the locked condition to rotate said member and effect piston reciprocation.

10. The combination set forth in claim 8 wherein said actuator assembly includes auxiliary driving means operatively connected with said sun gear, said auxiliary driving means, when inactive, maintaining the locking means operative and, when active, operative to rotate said ring gear when the locking means are released to actuate said valve in lieu of manual operation.

References Cited in the file of this patent

UNITED STATES PATENTS

| | | |
|---|---|---|
| 2,462,915 | Spielman | Mar. 1, 1949 |
| 2,476,376 | Laraque | July 19, 1949 |
| 2,511,384 | Trevaskis | June 13, 1950 |
| 2,620,683 | Geyer | Dec. 9, 1952 |
| 2,660,026 | Geyer | Nov. 24, 1953 |
| 2,678,177 | Chenery et al. | May 11, 1954 |

FOREIGN PATENTS

| | | |
|---|---|---|
| 987,883 | France | Apr. 18, 1951 |